May 3, 1960 C. A. DEMPSEY 2,935,598
ILLUMINATED PANEL
Filed May 5, 1958 3 Sheets-Sheet 1

INVENTOR.
CHARLES A. DEMPSEY
BY
John B. Grady
ATTORNEY

May 3, 1960 C. A. DEMPSEY 2,935,598
ILLUMINATED PANEL
Filed May 5, 1958 3 Sheets-Sheet 2
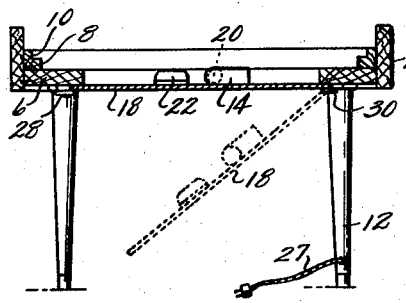
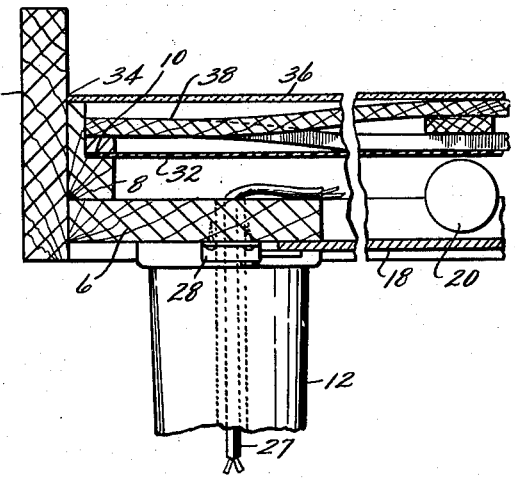
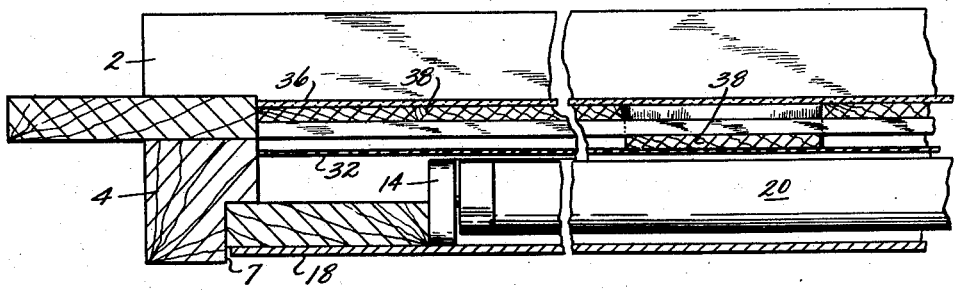
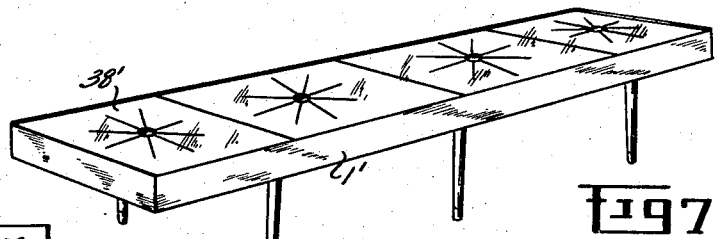
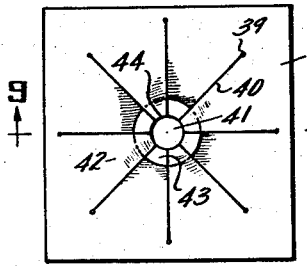
INVENTOR.
CHARLES A. DEMPSEY
BY
ATTORNEY May 3, 1960 C. A. DEMPSEY 2,935,598
ILLUMINATED PANEL
Filed May 5, 1958 3 Sheets-Sheet 3
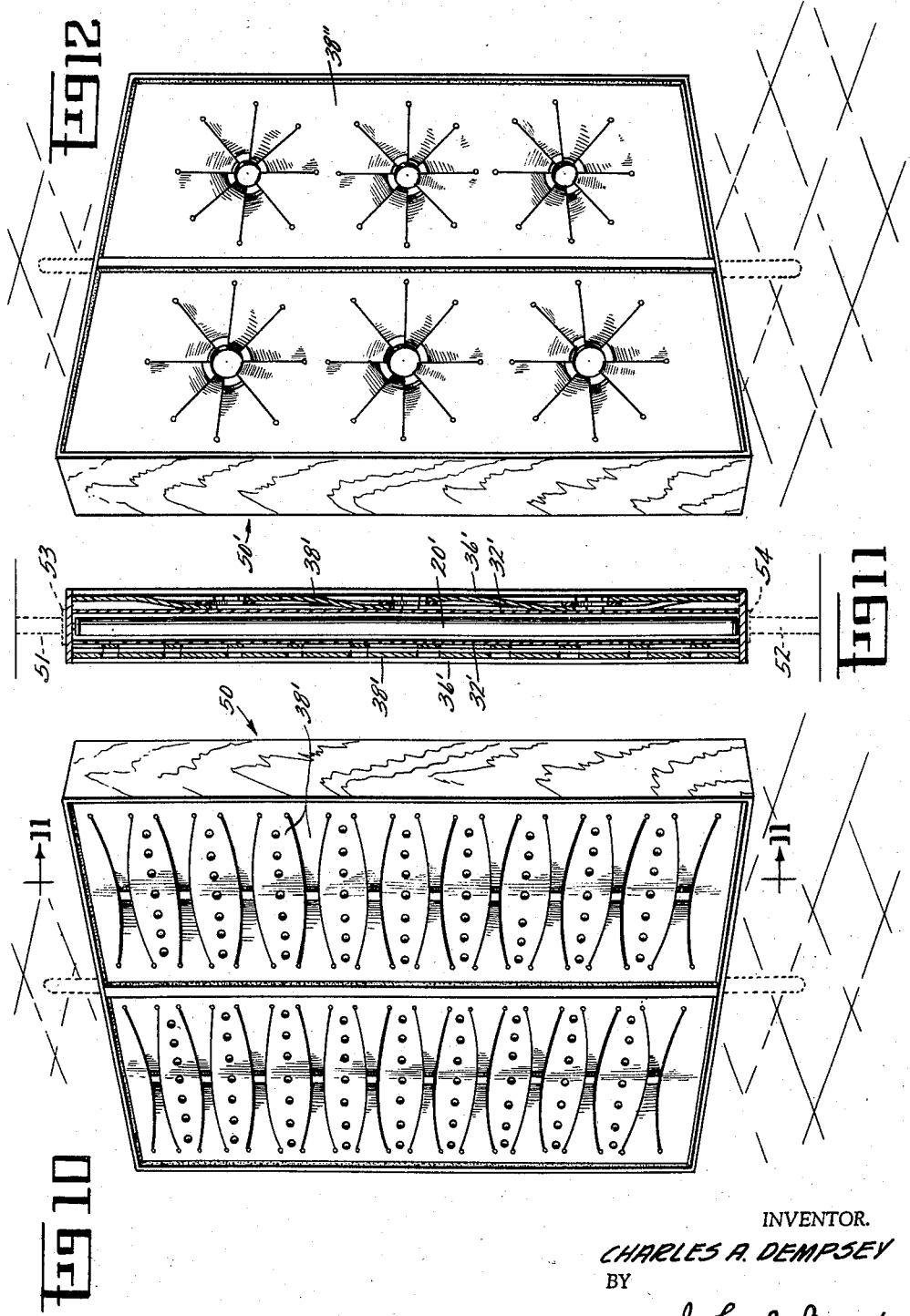
INVENTOR.
CHARLES A. DEMPSEY
BY
John B. Brady
ATTORNEY-

United States Patent Office 2,935,598
Patented May 3, 1960

2,935,598

ILLUMINATED PANEL

Charles A. Dempsey, Dayton, Ohio

Application May 5, 1958, Serial No. 732,943

3 Claims. (Cl. 240—4)

My invention relates to that class of devices known generally as illuminated panels and more particularly to illuminated panels where the illumination is shielded by a mask or cover having designs perforated therein.

It has long been known to illuminate signs by inserting a light source behind glass upon which is etched or painted desired messages. An example of this is the familiar "Exit" signs in places frequented by the public. It likewise has been well known to illuminate drafting, sketching and copying tables where the working surface is illumined from within a frame.

However, so far as I am aware, it is entirely new to provide panels that are illuminated from within a frame where the panel is provided with means to permit illumination to pass through portions of the panel with substantially the same luminosity.

It is the principal object of my invention to provide an illuminated panel.

It is a further object of my invention to provide an illuminated panel which may be employed as a coffee table.

It is a further object of my invention to provide a means to illuminate a panel with uniform luminosity from a single light source.

It is a further object of my invention to provide an illuminated frame for the insertion of an ornamental perforated mask or cover.

It is a further object of my invention to provide an illuminated panel wherein the illumination passes through a pair of matrices forming the outside covers of the panel thereby forming a double illuminated panel.

It is a further object of my invention to provide an illuminated panel suitable for walls, store fronts, display cases, room dividers, door dividers, overhead ceiling lighting and floor illumination.

It is a still further object of my invention to provide a frame holding a light source above which is placed a translucent plate over which may be removably mounted a mask having orifices or slits cut therein which, when depressed, braided or otherwise opened, emits light from the source through the openings, and a transparent top fitting the frame to provide an outside surface therefor.

The foregoing objects may be more readily apprehended by having reference to the drawings in which:

Figure 4 is an end elevation, partly in section, of the frame shown in Figure 2;

Figure 5 is a cross sectional detail view of part of one end of the table;

Figure 6 is a cross sectional detail view of a part of a side elevation of the table;

Figure 7 is a perspective view of a modification of my invention;

Figure 8 is a top plan detail view of one section of my modification;

Figure 9 is a section taken along the lines 9—9 of Figure 8;

Figure 10 is a perspective view of a further modification;

Figure 11 is a vertical sectional view taken along lines 11—11 of Figure 10;

Figure 12 is a perspective view of a still further modification.

Similar numerals refer to similar parts throughout the entire specification. Reference numerals to the frame components are understood to include matched parts.

Figure 1:
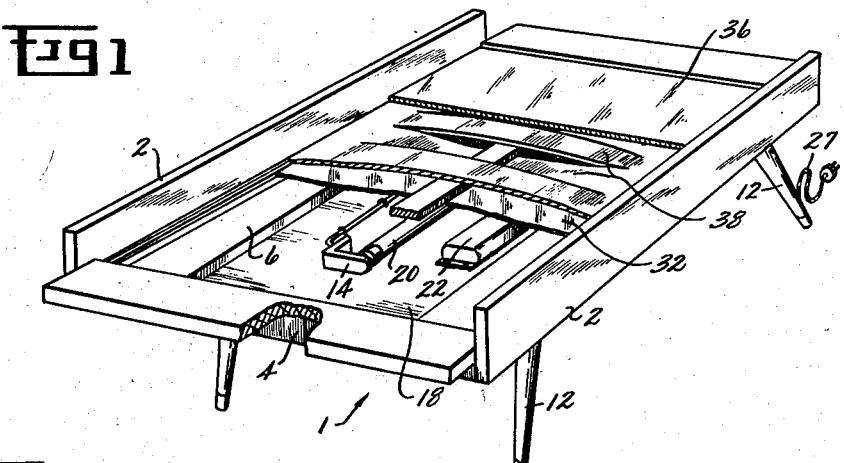
Figure 1 is a perspective view, partly in section showing my invention employed as a coffee table.
Figure 3:
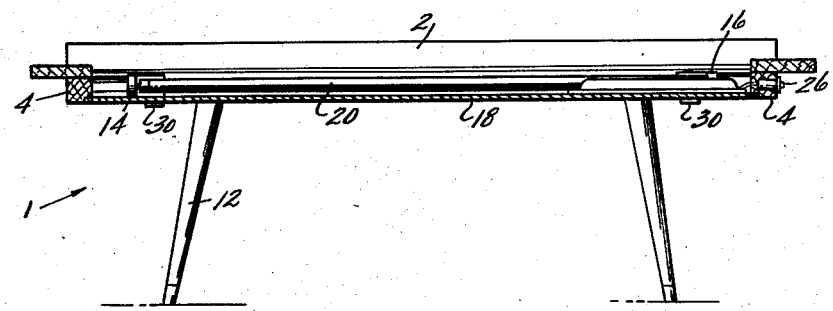
Figure 3 is a section taken along lines 3—3 of Figure 2.

As shown in my drawings, I provide a frame indicated generally as 1 having side rails 2 and cross rails or ends 4. Attached to the side rails 2, I mount leg supports 6 substantially as shown. The leg supports 6 may be attached to the side rails 2 as by gluing and extend the entire length of the sides of the frame 1. As shown in Figure 6, in practice I have found it expedient to lend support to the frame 1 by providing that the leg supports 6 mate in the recess 7 which may be cut, rabbeted, or otherwise formed in the cross rails 4. This construction permits gluing the leg supports to the end rails 4 forming thereby a strong support.

As shown in Figure 5 I mount a pair of side supports 8 nested to the side rails 2 and the leg supports 6. These side supports 8 may be attached as by gluing or by any other well known means to the leg supports 6 and the side rails 2 substantially as shown. I provide a step 10 in the side support rails 8 for purposes which will be readily apparent.

The legs 12 may be attached to the leg supports 6 by any well known method. In practice I have found the usual screw stud with recessed nut arrangement (not shown) highly satisfactory but since this forms no part of my invention I have not disclosed any particular method of mounting the legs 12.

Having described my preferred embodiment of the frame 1 of my invention, I shall now described the mounting I prefer for the light source and other components.

For convenience, I employ a fluorescent tube light source 20 because it lends itself readily to my purposes. However, any light source such as a plurality of fluorescent tubes, bulbs, or one or more luminescent sheets, could be employed as satisfactorily. With this in mind, I shall describe my preferred mounting of a fluorescent tube as my light source.

Figure 2:
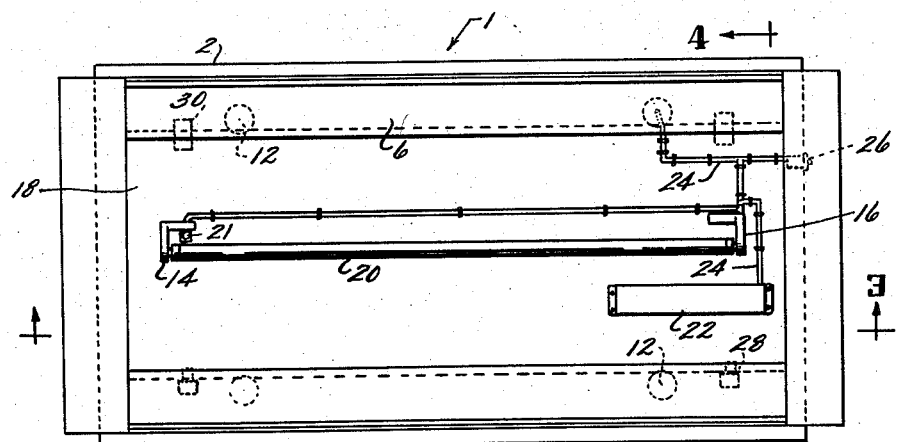
Figure 2 is a top view of the frame showing the light source mounting.

As shown in the drawings, I mount the usual lamp brackets 14 and 16 on a sheet of Masonite which forms the base or bottom 18 of my frame 1. This base 18 may be solid or perforated to permit light to pass through it in selected areas or may be omitted altogether. In the latter event, I would prefer to suspend the lamp brackets 14 and 16 in any of the well known methods such as extension brackets (not shown) extending inwardly from the ends 4. Thus the lamp 20 would be suspended within the frame 1 in the plane of the frame formed by the sides 2 and the ends 4. The usual starter 21 is mounted in the convenient position as shown and the transformer 22 is connected into the system by the usual wiring denominated generally as 24. A switch 26 is provided at one end of the frame substantially as shown. A lead 27 is provided for power supply. I prefer to run the lead 27 through one of the legs 12 as disclosed. It will be clear that under the embodiment of my invention without a base board whereunder the lamp 20 is suspended within the frame, the transformer 22 will likewise be suspended. However, when the base 18 is provided, the transformer 22 may be fastened on the base 18 into position substantially as shown in Figure 2. For convenience, I provide a pair of hinges 30 along one of the leg supports 6 mounted on one of the leg supports 6 and the base 18; and a pair of latches 28 on the other leg support 6 to permit ready access to the light source assembly by allowing the base 18 to be held in a closed position by the latches 28 and to permit it to be lowered by means of the hinges 30 substantially as shown. This hinge-latch arrangement is shown for illustrative purposes only and I do not intend my invention to be limited to any particular form or configuration of this feature. The base 18 may be painted or otherwise covered as with glass beads to provide a mat reflection from the light source, if desired.

As shown in Figure 5, in the step 10 of the side support rails 8, I place a translucent sheet preferably of plastic, ground or frosted glass. This sheet forms a cover 32 over the light source 20 and, because of its translucency, transmits the mat reflection from the base 18 as well as a diffused light directly from the lamp 20. The cover 32 may be removable but under normal circumstances I prefer that it be stapled or cemented or otherwise fastened as a fitted cover within the frame extending coextensively therewith. If desired, this cover may not be wholly translucent, but it will be clear to those skilled in the art that it may be provided with shaded portions of a predetermined design.

Placed on the edge 34 of the side supports 8, I mount a transparent top 36 which may be of glass or plastic. I prefer that the top 36 completely fill the inside of the frame 1. In practice I have found merely dropping the top 36 into position is satisfactory but, if desired, the top 36 could readily be fastened into position. Referring to Figure 5, it will be apparent that there is space between the cover 32 and the top 36. Into this space I have thus provided, I place a perforated sheet of opaque material such as plywood or the like. This sheet forms a removable mask or matrix 38 through which light from the source 20 is permitted to pass at the points or places of perforation. Of course, the mask 38 need not be entirely opaque but might be a transparent sheet rendered partially opaque by painting or otherwise inscribing designs thereon, permitting light from the source 20 to pass through the unpainted portions of the mask 38.

In practice as stated above, I prefer that the mask 38 may be removed from the top. For this purpose, I provide that the glass 36 is adapted to be dropped in place as well as the mask 38. Since the cover 32 is firmly held in place, I have thus provided a means of readily removing the mask 38 or replacing it with another mask 38' of a different design by simply lifting out the glass 36 and then the mask 38 without disturbing the balance of my frame 1.

Having described my preferred embodiment of my invention employed as a table top, it will be clear to those skilled in the art that my invention is equally applicable to form a display panel, a store front, partitions, ceilings, floors, head boards, and dining tables without departing from my invention.

Referring to Figure 7, I have shown schematically my invention applied to form a dining table. The mask 38' has a different pattern of perforation. In this embodiment the holes 39 are symmetrically spaced and saw cuts 40 lead therefrom to a center hole 41. By this means I provide a plurality of truncated pyramidal sections 42. I provide a ring 43 which may be of contrasting color to that of the mask 38'. The ring 43 is woven among the truncated ends 44 of the pyramidal sections 42 as shown in Figure 9. I have thus provided an ornamental mask 38' which, when placed in position in the frame 1' as described above, will permit light to pass through the separations caused by the saw cuts 40 being depressed and raised by the weaving of the ring 43 as shown. By providing a plurality of these masks 38' in a large frame 1', I provide a dining table, display table or side board, constructed to my unique design.

For illustrative purposes I shall now describe a double panel formed in accordance with my invention.

Referring to Figure 10, I have shown my invention in the form of a double panel suitable for, among other purposes, room partitions, display panels, wall, ceiling and floor components.

In my preferred embodiment I provide a frame indicated generally as 50 which is adapted to be mounted on posts 51 and 52 which may be inserted in the usual flange-plates 53 and 54 for support. It is clear that the posts 51 and 52 may be omitted and suitable base supports or other mountings may be provided if my invention is to be employed as a free standing partition, wall, ceiling and floor components, without departing from the scope of my invention. The light source 20' is mounted within the frame 50 in the usual manner, together with the necessary transformer. A switch (not shown) may be provided and placed at any convenient position. A pair of translucent cover sheets 32' are placed substantially as shown, placing the light source 20' intermediate for the purposes described above. A pair of ornamental masks 38' may be laid flat against their respective covers 32' which may be fastened into position by any of the well known means such as by gluing, stapling, or by providing that the masks 38' are slightly larger than the inside area of the frame 50, forming thereby a press fit.

While not essential, if desired, a pair of glass tops 36' may be positioned substantially as shown. Of course, the frame 50 could be circular if desired in which case there would be only one side 50' instead of four as shown.

Referring to Figure 12, I have shown my invention just described but with a different ornamental mask 38" in position to illustrate the versatility of my unique arrangement.

It will be clear that my simple engineering modifications of my invention could be placed in a wall, a ceiling, in floor sections; or could form a free standing room divider, a door divider, or a wind screen, which would provide illuminated panels of decorative effect. When employed as a floor, I have found in practice the top 36 could be made of Tuflex which provides a satisfactory walking surface.

Having described my invention, what I regard as new and desire to protect by Letters Patent, is:

1. An illuminated panel structure comprising: a frame; a light source mounted within said frame; a translucent cover for said light source, said cover being substantially coextensive with and fitted into said frame; a transparent top member substantially coextensive with and fitted to said frame; and a mask of opaque material also substantially coextensive with and fitted into said frame intermediate said translucent cover and transparent top, said mask being slotted in a predetermined design to form a plurality of adjacent segments, and including means maintaining the adjacent segments displaced in opposite directions with respect to their initial common plane thereby yielding a three dimensional configuration for the passage of light from said source therethrough.

2. An illuminated table comprising: a frame; legs supporting said frame; a bottom for said frame hingedly connected to the under side thereof; means on said frame to releasably hold said bottom in a closed position; a light source mounted on said bottom; a transparent top for said table, said top being substantially coextensive with said frame; a translucent sheet fitted within said frame, substantially coextensive therewith and positioned intermediate said light source and said top in spaced parallel relationship to said top and said light source; and a mask substantially coextensive with said frame, and positioned intermediate said transparent top and translucent sheet, said mask being slotted to form a plurality of adjacent segments and including means forming a part thereof maintaining said adjacent segments displaced in opposite directions with respect to their initial common plane, thereby yielding a three dimensional configuration for the passage of light from said source therethrough.

3. An illuminating panel structure comprising: a frame; a light source mounted within said frame and located substantially centrally thereof; a pair of sheets of translucent material substantially coextensive with and fitted within said frame in parallel relation to each other and to said frame, one positioned on each side of said light source; a pair of transparent covers, each substantially coextensive with and mounted on the outer surfaces of said frame in parallel relation to each other and to said translucent sheets; a pair of masks of opaque material, each of substantially the same size as said translucent and transparent sheets and one mounted between each translucent and transparent sheets, said masks being slotted in a predetermined design to form a plurality of adjacent segments and including means forming a part thereof and maintaining the adjacent segments displaced in opposite directions with respect to their initial common plane, thereby yielding a three dimensional configuration for the passage of light from said source therethrough.

References Cited in the file of this patent

UNITED STATES PATENTS

| | | |
|---|---|---|
| 1,348,957 | Pope | Aug. 10, 1920 |
| 2,294,444 | Boroughs | Sept. 1, 1942 |
| 2,701,838 | Loesch | Feb. 8, 1955 |